Figure 1:
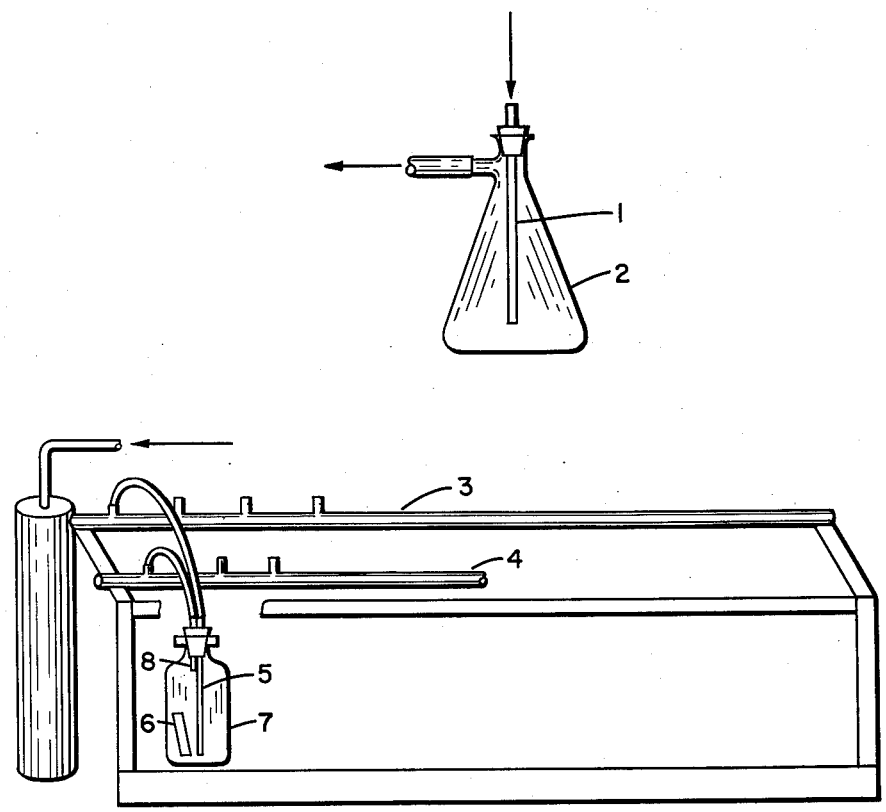

Oct. 30, 1962 O. L. RIGGS, JR 3,061,553
CORROSION INHIBITORS
Filed July 7, 1958 2 Sheets-Sheet 1

INVENTOR.
OLEN L. RIGGS. JR.
BY
*Floyd Trimble*
ATTORNEY

Oct. 30, 1962   O. L. RIGGS, JR   3,061,553
CORROSION INHIBITORS

Filed July 7, 1958   2 Sheets-Sheet 2

INVENTOR.
OLEN L. RIGGS. JR.
BY
Floyd Trimble
ATTORNEY

United States Patent Office 3,061,553
Patented Oct. 30, 1962

3,061,553
CORROSION INHIBITORS
Olen L. Riggs, Jr., Ponca City, Okla., assignor to Continental Oil Company, Ponca City, Okla., a corporation of Delaware
Filed July 7, 1958, Ser. No. 747,097
10 Claims. (Cl. 252—392)

This invention relates to corrosion inhibitors useful for retarding or the prevention of corrosion of metallic equipment used in oil wells and connecting pipe lines in intermediate storage to the refinery for crude oil and is a continuation-in-part of my co-pending application Serial No. 615,081 filed October 10, 1956, now abandoned, entitled "Corrosion Inhibitors." More particularly, I have found that the reaction product formed by reacting an amine and a critical amount of an organic hydroxy acid, when added to well fluids in minor proportions, acts to inhibit the rusting or corrosion of the metallic equipment used in the well due to hydrogen sulfide and carbon dioxide environments.

Considerable corrosion takes place in the metallic equipment of practically all oil wells; and in certain environments the corrosion may reach costly proportions. For example, casing, tubing, sucker rods, and lead lines are particularly subject to corrosion. The sucker rods and sucker rod boxes which operate under heavy cyclic load conditions are especially susceptible to failure through corrosion fatigue. As a result of corrosion, costs of operations are greatly increased because of the necessity of pulling tubing and sucker rods for repair or replacement. In addition, indirect costs in terms of production losses while shut down for repair or replacement are high.

It is, therefore, a principal object of this invention to provide a method of preventing corrosion in oil wells which is effective and economical. Another object of my invention is to provide a substance which can be added to the oil well which will control corrosion and particularly will reduce pitting without any adverse effects on the crude oil. Other objects and advantages will be apparent from the following description.

In brief, I have discovered that the addition of a minute amount of the reaction product formed by reacting one molar equivalent of an amine having a molecular weight within a range of from about 150 to about 500 and 0.1 to about 0.6 equivalent of an organic hydroxy acid which acid is relatively heat stable and has an ionization constant of at least $1 \times 10^{-5}$ is very effective in inhibiting or preventing corrosion of the metal surfaces exposed to well fluids.

I have found that the corrosive effects of the fluids on metallic surfaces can be substantially reduced and in many cases practically eliminated by the introduction of an exceedingly small quantity of the reaction product of such an amine and such an acid into the well. The inhibitor may be added to the well fluids by any conventional method, usually by merely injecting the desired amount of the inhibitor into the well. As another method of introducing the inhibitor into the well, a tubing of relatively small diameter may be run down the center of the production tube of the well to approximately the bottom end thereof and a solution of the inhibitor may be pumped through the small diameter tubing so as to enter the well stream near the bottom of the well tube. The rising turbulent flow will then carry the injected inhibitor up through the tube. Obviously, the corrosion inhibitor may be added or introduced into the well by other means or methods, depending in part on whether the wells are operated through the casing or through tubing disposed in such casings. Also, it is clear that the inhibitors may be introduced into the top of the well and allowed to flow down or may be forced through any given point or points in the well at which the inhibitor then can come in contact with the turbulent up-going fluid mixture which, as stated, would cause metal corrosion but for the presence of the corrosion inhibitors of this invention. The effective and preferred proportions of my inhibitor are in the range approximating 1 to 500 and 5 to 100 parts per million of well fluid respectively, namely, crude oil in brine. After separating the brine from the crude oil, the resulting crude oil exhibits favorable corrosion inhibiting properties when transported through connecting pipe lines to the refinery.

The corrosion inhibitors of this invention may be introduced into the system as such; or they may be dissolved in a suitable solvent such as mineral oil, crude oil, kerosene, gasoline, organic esters, alcohols, ketones, or even water. Although any solvent which is nonreactive with the corrosion inhibitor may be employed, kerosene or a light hydrocarbon fraction is preferred as the particular solvent. When a solvent is used, it is preferred to use a concentration of corrosion inhibitor varying from about 20 to 40 percent.

Before proceeding with specific examples illustrating my invention, it may be well to indicate in general the types of materials that may be used in my invention.

Suitable amines include secondary aliphatic and heterocyclic amines. Amines having two to about five amino groups per molecule are useful. Examples of useful heterocyclic amines include: 1-aminoalkyl-2-alkyl imidazolines such as 1-2 aminoethyl-2-heptadecyl imidazoline and 1-hydroxy propyl-2-pentadecyl imidazoline. Very valuable reaction products may be prepared from secondary aliphatic polyamines, including the alkyl polyalkylene polyamines such as N-dodecylethylenediamine, N-octadecylethylenediamine, N - dodecyltrimethylenediamine, N-pentadecyltrimethylenediamine, N-octadecyltetramethylenediamine, N-octadecyl-1,3-butanediamine, N-dodecyldiethylenetriamine, and N - octadecyltetraethylenepentamine. Especially valuable reaction products may be prepared from the polyamine derivatives of natural oils and fats. Such a derivative is the N-alkyltrimethylenediamine material obtained by reacting tallow or tallow acids with trimethylenediamine and hydrogenating the resulting material. This derivative is commercially available from Armour and Company as Duomeen T. Other similar derivatives of trimethylenediamine are Duomeen S, O, and C that have been prepared in a similar manner from oleic acid, cocoanut, and soyabean oil.

About the only requirement is that the organic hydroxy acid be reasonably stable to heat and have an ionization constant of at least $1 \times 10^{-5}$. Examples of suitable organic hydroxy acids include: hydroxy benzoic, hydroxy butyric, hydroxy caproic, leucic acid, hydroxy caprylic, hydroxy glutamic, hydroxy glutaric, hydroxy methyl benzoic, hydroxy naphthoic, hydroxy nicotinic, hydroxy phenyl acetic, hydroxy stearic, hydroxy toluic, and hydroxy valeric.

The reaction product of the amine and the critical amount of acid can be prepared by simply mixing the amine and the acid. The reaction product, however, can also be the dehydration product that is obtained by heating the mixture of amine and acid to temperatures at which water is eliminated. This latter type of reaction product is formed only in those instances in which the amine has a reactive hydrogen, i.e., a primary or secondary amine. Since the critical amount of acid used in preparing the reaction product is considerably less than the equivalent weight, the reaction product most probably consists of amine plus a critical amount of salt for those products prepared without elimination of water, amine plus a critical amount of amide where the amine is primary or secondary and water is eliminated, or amine plus a critical amount of imidazoline or where the amine is a polyamine having nitrogens with reactive hydrogens separated by alkylene groups of two or three carbon atoms respectively.

Since the reaction product of this invention may be obtained by the reaction of one molecular weight equivalent of amine and from 0.1 to 0.6 molecular weight equivalent of acid, it should be obvious that the reaction products might be prepared by mixing one molecular weight of the amine with 0.25 to 1.5 molecular weight equivalents of a salt, amide, or two nitrogen heterocyclic compound that may be prepared from the amine and the acid.

In addition to the uses enumerated above, my inhibitors may be used effectively to inhibit corrosion in tankers carrying crude oil or refined petroleum products. They are also valuable in preventing corrosion of pipe lines carrying either crude oil or petroleum refined products.

In order to disclose the nature of the present invention still more clearly, the following illustrative examples will be given. It is to be understood, however, that the invention is not to be limited to the specific conditions or details set forth in these examples except in so far as such limitations are specified in the appended claims. Parts given are parts by weight.

The efficiencies of the various inhibitors were determined both in hydrogen sulfide and carbon dioxide environments. The methods used are as described under Procedures A and B below.

PROCEDURE A

Efficiencies of corrosion inhibitors in a hydrogen sulfide environment were compared by determining the percent protection given a mild carbon steel test coupon subjected to corrosive conditions in the presence of the corrosion inhibitor in the equiment illustrated in FIG. 1. A large mouth bottle of about 250-mil. capacity 7 was charged with 150 ml. of Arbuckle brine and 50 ml. of kerosene containing the corrosion inhibitor being tested. The bottle was agitated to distribute the corrosion inhibitor between the two phases, a weighed 1-inch by 3-inch 10–20 mild carbon steel coupon inserted, and bottle stopper fitted on. Hydrogen sulfide was bubbled through the solution at a rate of about 12 ml. per second. After about 18 hours, the coupon was removed from the bottle, descaled by scrubbing with a nylon bristle brush and a cleaning powder, weighed and its loss in weight determined. The same technique was followed to obtain a blank in the absence of corrosion inhibitor. The percent protection was calculated as follows:

$$P.C.P. = \frac{(Wb_i - Wb_f) - (Wc_i - Wc_f)}{(Wb_i - Wb_f)} \times 100$$

where $P.C.P.$=percent protection afforded by inhibitor.
$Wb_i$=initial weight of coupon subjected to test in the absence of inhibitor.
$Wb_f$=final weight of coupon subjected to test in the absence of inhibitor.
$Wc_i$=initial weight of coupon subjected to test in presence of inhibitor.
$Wc_f$=final weight of coupon subjected to test in the presence of inhibitor.

PROCEDURE B

Figure 2:
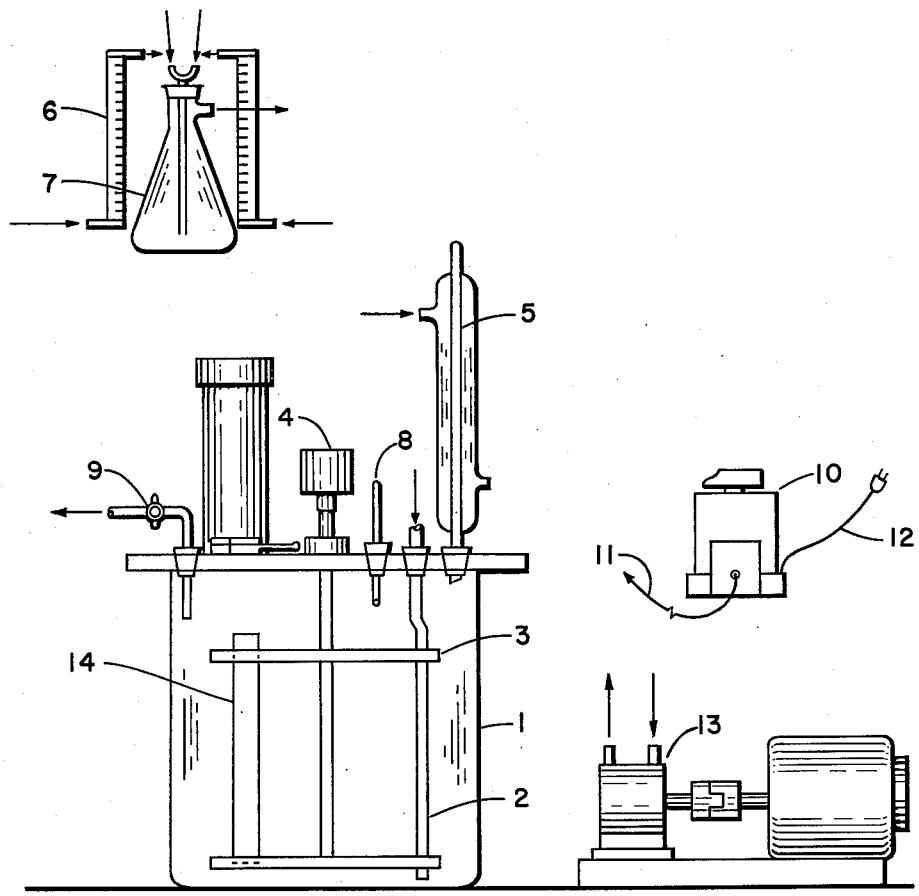

Equipment suitable for determination of corrosion in an atmosphere of carbon dioxide is shown in FIG. 2. Vessel 1 is equipped with a motor 4 for rotating a coupon holder 3 holding coupon 14. Provisions 2 and 5 provide for introducing and exhausting carbon dioxide that has been metered in flow meter 6 and saturated with water vapor in wetting vessel 7. Item 8 is a thermometer for indicating the temperature of the fluids undergoing test and 9 is a means for withdrawing samples of fluid undergoing test. Pump 13 supplies means for maintaining immiscible fluids in dispersed state. Item 10 is a variac for regulating the speed of the motor 4. Corrosion rate in units of mil penetration per year is calculated as follows:

$$M.P.Y. = \frac{1000(W_i - W_f)}{g^A t}$$

where:

$M.P.Y.$=mils penetration per year.
$W_i$=initial weight of coupon in grams.
$W_f$=final weight of coupon in grams.
$g$=specific weight of coupon in grams per cubic inch.
$A$=area of coupon in square inches.
$t$=duration of corrosion test in years.

The present invention may be clearly understood from the following examples which are given by way of illustration only and are not intended to be considered as a limitation of the invention.

*Example 1*

160 parts (0.4 mole) of Duomeen T (calculated on the basis of 80% N-octadecyltrimethylenediamine), 13.8 parts of salicylic acid (0.1 equivalent), and 433 parts of toluene were placed in a reaction vessel equipped with an agitator and apparatus for the azeotropic distillation of water. The mixture was heated at reflux until about 3.5 parts of water was removed after which the toluene was removed from the reaction product (0.25 equivalent of acid per equivalent of amine) by distillation.

In a like manner a reaction product was prepared using 0, 22.1, 36.4, 82.8, 138, and 221 parts, respectively, of salicylic acid. The reaction products had a ratio of equivalents of acid per equivalent of amine of 0.0, 0.25, 0.4, 0.66, 1.5, 2.5, and 4.0 respectively. Each of the reaction products was diluted with kerosene to form a solution containing 20 percent active reaction product. The following table gives the percent protection afforded mild carbon steel by these reaction products when tested at a concentration of 5 p.p.m. of 20 percent active kerosene solution in accordance with Procedure A over a period of 48 hours:

| Test No. | Reaction Product—eq. acid/eq. amine | Percent Protection |
| --- | --- | --- |
| 1 | 0.0 | 89 |
| 2 | 0.25 | 94 |
| 3 | 0.4 | 94 |
| 4 | 0.66 | 69 |
| 5 | 1.5 | 66 |
| 6 | 2.5 | −30 |
| 7 | 4.0 | −28 |

The inhibitor prepared in accordance with my invention is very effective, particularly at low concentrations. As a general rule, the inhibitors disclosed in the prior art must be used at higher concentrations to be effective. As an example one of the prior art inhibitors is naphthenyl amine. A comparison of this inhibitor with my inhibitor is summarized in the table below:

| Concentration in p.p.m. | Percent Reduction in Weight Loss | |
|---|---|---|
| | Inhibitor Used in Test No. 2 Above | Naphthenyl Amine |
| 1,000 | | 98.9 |
| 400 | | 98.9 |
| 200 | | 100.0 |
| 100 | 98.1 | 96.0 |
| 80 | 97.9 | 86.1 |
| 67 | 97.7 | 79.7 |
| 50 | 97.5 | 66.1 |
| 40 | 97.2 | 48.1 |
| 33 | 97.0 | 29.7 |
| 25 | 96.8 | 16.5 |
| 20 | 96.3 | 16.5 |
| 10 | 95.3 | 10.8 |
| 5 | 94.4 | |
| 4 | 90.1 | |
| 3 | 83.3 | |
| 2 | 72.6 | |
| 1 | 33.2 | |

*Example 2*

When corrosion tests are repeated in accordance with Example 1 with the exception that the hydroxy benzoic acid is replaced by hydroxy butyric, hydroxy caproic, leucic acid, hydroxy caprylic, hydroxy glutamic, hydroxy glutaric, hydroxy methyl benzoic, hydroxy naphthoic, hydroxy nicotinic, hydroxy phenyl acetic, hydroxy stearic, hydroxy toluic, and hydroxy valeric very similar results are obtained.

Examples 1 and 2 were repeated except that the corrosion tests were conducted in a carbon dioxide environment in accordance with Procedure B rather than in a hydrogen sulfide environment in accordance with Procedure A. The results were similar.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. The method of inhibiting corrosion of ferrous metals in contact with corrosive fluids containing an acidic reactant selected from the group consisting of carbon dioxide and hydrogen sulfide which comprises the addition to said fluids 1 to 500 p.p.m. of the reaction product formed by reacting 1 mole of an N-alkylpolyalkylenepolyamine having a molecular weight within the range of 150 to 500 and from two to about five amino groups per molecule with 0.1 to 0.6 equivalent of a hydroxy benzoic acid at a temperature sufficiently high to effect elimination of water.

2. The method of inhibiting corrosion of ferrous metals in contact with corrosive fluids containing an acidic reactant selected from the group consisting of carbon dioxide and hydrogen sulfide which comprises the addition to said fluids 5 to 100 p.p.m. of the reaction product formed by reacting 1 mole of an alkyl polyalkylenepolyamine having a molecular weight within the range of 150 to 500 with 0.1 to 0.6 equivalent of a hydroxy benzoic acid at a temperature sufficiently high to effect elimination of water.

3. The method of claim 2 wherein the corrosive fluids contain carbon dioxide.

4. The method of claim 2 wherein the corrosive fluids contain hydrogen sulfide.

5. The process of claim 2 wherein the amine is N-octadecylethylenediamine.

6. The process of claim 2 wherein the amine is N-dodecyltrimethylenediamine.

7. The process of claim 2 wherein the amine is N-pentadecyltrimethylenediamine.

8. The process of claim 2 wherein the amine is N-dodecylethylenediamine.

9. As a corrosion inhibiting agent, a reaction product formed by reacting 1 mole of an N-alkylpolyalkylenepolyamine having a molecular weight within the range of 150 to 500 and from two to about five amino groups per molecule with 0.1 to 0.6 equivalent of a heat stable organic hydroxy acid having less than three carboxy groups and an ionization constant of at least $1 \times 10^{-5}$ at a temperature sufficiently high to effect elimination of water.

10. The corrosion-inhibiting product formed by reaction of 0.1 to 0.6 equivalent of salicylic acid with an N-alkyltrimethylenediamine wherein the alkyl group is derived from a fatty acid, employing a reaction temperature sufficiently high to effect elimination of water.

References Cited in the file of this patent

UNITED STATES PATENTS

| | | |
|---|---|---|
| 2,598,213 | Blair | May 27, 1952 |
| 2,640,029 | Blair | May 26, 1953 |
| 2,720,490 | Oxford | Oct. 11, 1955 |
| 2,756,211 | Jones | July 24, 1956 |
| 2,818,383 | Jolly | Dec. 31, 1957 |
| 2,819,284 | Shen | Jan. 7, 1958 |
| 2,828,259 | Wirtel et al. | Mar. 25, 1958 |
| 2,833,712 | Jones | May 6, 1958 |